(12) United States Patent
Fankhauser et al.

(10) Patent No.: US 8,651,510 B2
(45) Date of Patent: Feb. 18, 2014

(54) TRAILER WITH LOWERABLE AND RAISABLE TRAILER BED

(75) Inventors: Jason Fankhauser, Victoria (AU); Colin McKay, Victoria (AU)

(73) Assignee: Innovare Motion Pty Ltd., Victoria (AU)

( * ) Notice: Subject to any disclaimer, the term of this patent is extended or adjusted under 35 U.S.C. 154(b) by 343 days.

(21) Appl. No.: 12/811,522

(22) PCT Filed: Dec. 24, 2008

(86) PCT No.: PCT/AU2008/001907
§ 371 (c)(1),
(2), (4) Date: Jul. 2, 2010

(87) PCT Pub. No.: WO2009/086586
PCT Pub. Date: Jul. 16, 2009

(65) Prior Publication Data
US 2010/0289250 A1 Nov. 18, 2010

(30) Foreign Application Priority Data

Jan. 4, 2008 (AU) .................................. 2008900040
Oct. 30, 2008 (AU) .................................. 2008905593

(51) Int. Cl.
*B60D 1/46* (2006.01)
(52) U.S. Cl.
USPC ...................................................... 280/490.1
(58) Field of Classification Search
USPC ................ 280/490.1, 124.158; 414/481, 482
See application file for complete search history.

(56) References Cited

U.S. PATENT DOCUMENTS

| 2,453,388 | A | * | 11/1948 | Schramm | 280/43.18 |
| 2,687,225 | A |   | 8/1954  | Martin   |           |
| 2,806,710 | A |   | 9/1957  | Mascaro  |           |
| 2,918,298 | A | * | 12/1959 | Starr    | 280/43.23 |
| 3,063,737 | A |   | 11/1962 | Coughran |           |

(Continued)

FOREIGN PATENT DOCUMENTS

AU   5038598   7/1998
AU    782034   5/2002

(Continued)

OTHER PUBLICATIONS

Lift-A-Load Elevating Platform Trailer, Stop, Drop and Load, Manufactured by Advance Metalworking Co., Inc. (6 pages), (Applicant is unaware of the publication date, but became aware of the brochure on Mar. 27, 2008).

(Continued)

*Primary Examiner* — Tashiana Adams
(74) *Attorney, Agent, or Firm* — Oblon, Spivak, McClelland, Maier & Neustadt, L.L.P.

(57) ABSTRACT

A trailer including: i) a draw bar; ii) a trailer frame supporting a trailer bed; iii) an arm including a first pivot mount; iv) an axle pivotally connected to the arm at the first pivot mount; v) an actuating mechanism actuatable to exert a force on the arm relative to the trailer frame. The axle includes at least one associated wheel and the wheel has a plane of rotation in which the wheel rotates when traveling in a forward direction, and the actuating mechanism is located substantially in the plane of rotation. The trailer bed may be raised or lowered by exerting a force on the arm relative to the trailer frame.

47 Claims, 15 Drawing Sheets

(56) References Cited

U.S. PATENT DOCUMENTS

| | | | | |
|---|---|---|---|---|
| 3,135,401 | A | 6/1964 | Schramm | |
| 3,489,427 | A | 1/1970 | Vearnals et al. | |
| 3,633,776 | A | 1/1972 | Moore | |
| 3,653,680 | A | 4/1972 | Denny | |
| 3,788,675 | A | 1/1974 | Wilander | |
| 3,856,319 | A * | 12/1974 | Hardy | 280/63 |
| 3,866,935 | A * | 2/1975 | Nelson | 280/43.23 |
| 4,003,583 | A | 1/1977 | Stanzel | |
| 4,049,143 | A | 9/1977 | Hatakka et al. | |
| 4,058,325 | A | 11/1977 | Schramm | |
| 4,077,642 | A | 3/1978 | Clark | |
| 4,286,800 | A | 9/1981 | Lomas | |
| 4,302,022 | A | 11/1981 | Schoeffler et al. | |
| 4,308,920 | A | 1/1982 | Floyd et al. | |
| 4,318,656 | A | 3/1982 | Ezell | |
| 4,372,572 | A | 2/1983 | Verschage | |
| 4,568,094 | A * | 2/1986 | Lovell | 280/6.151 |
| 4,637,770 | A | 1/1987 | Swadell | |
| 4,685,855 | A | 8/1987 | Celli | |
| 4,747,746 | A | 5/1988 | Wise | |
| 4,783,093 | A | 11/1988 | Cusick et al. | |
| 4,806,065 | A | 2/1989 | Holt et al. | |
| 4,943,193 | A | 7/1990 | Koskinen et al. | |
| 4,945,744 | A | 8/1990 | Lienert | |
| 5,161,814 | A | 11/1992 | Walker | |
| 5,224,814 | A | 7/1993 | Dolev | |
| 5,433,578 | A | 7/1995 | Honan | |
| 5,474,416 | A | 12/1995 | Rogge et al. | |
| 5,476,274 | A | 12/1995 | Oberlander | |
| 5,551,715 | A | 9/1996 | Pickard | |
| 5,630,693 | A | 5/1997 | Sobina | |
| 5,649,802 | A | 7/1997 | Babcock | |
| 5,765,859 | A * | 6/1998 | Nowell et al. | 280/86.5 |
| 5,810,544 | A | 9/1998 | Wellman | |
| 5,846,120 | A * | 12/1998 | Barton, Jr. | 446/434 |
| 5,887,880 | A | 3/1999 | Mullican et al. | |
| 6,058,885 | A | 5/2000 | Putze | |
| 6,113,130 | A * | 9/2000 | Saulce | 280/656 |
| 6,126,378 | A | 10/2000 | Landoll et al. | |
| 6,149,369 | A | 11/2000 | Reed | |
| 6,155,769 | A * | 12/2000 | Robinson | 414/498 |
| 6,273,435 | B1 | 8/2001 | Stringer | |
| 6,302,635 | B1 | 10/2001 | Koelker et al. | |
| 6,439,145 | B1 * | 8/2002 | Mensch | 114/61.18 |
| 6,530,580 | B1 * | 3/2003 | Simpson | 280/6.151 |
| 6,857,643 | B2 * | 2/2005 | Neider | 280/43.18 |
| 6,923,452 | B1 | 8/2005 | Zachmeier et al. | |
| 6,962,370 | B2 | 11/2005 | Simpson | |
| 7,044,704 | B1 | 5/2006 | Roose | |
| 7,153,080 | B2 | 12/2006 | Schmidt | |
| 7,156,591 | B2 | 1/2007 | Marola | |
| 7,163,212 | B1 | 1/2007 | Rupp | |
| 7,175,205 | B2 | 2/2007 | Simpson | |
| 7,281,728 | B1 | 10/2007 | Wayrynen | |
| 8,016,316 | B1 * | 9/2011 | Carlton | 280/656 |
| 2002/0060473 | A1 | 5/2002 | Gee | |
| 2003/0067140 | A1 | 4/2003 | Gunderson | |
| 2003/0067206 | A1 * | 4/2003 | Russell et al. | 298/17 B |
| 2004/0105743 | A1 | 6/2004 | Franklund | |
| 2004/0184903 | A1 | 9/2004 | Neider | |
| 2006/0001230 | A1 | 1/2006 | Finch | |
| 2006/0045693 | A1 * | 3/2006 | Elliot et al. | 414/481 |
| 2006/0087099 | A1 | 4/2006 | Marola | |
| 2007/0059137 | A1 | 3/2007 | Schmidt | |
| 2007/0182150 | A1 | 8/2007 | Simpson | |
| 2007/0222169 | A1 | 9/2007 | Smith et al. | |
| 2008/0257656 | A1 * | 10/2008 | Skinner et al. | 188/1.11 E |

FOREIGN PATENT DOCUMENTS

| | | |
|---|---|---|
| CA | 2 134 846 | 5/1996 |
| CA | 2 238 454 | 11/1999 |
| EP | 0 068 772 | 1/1983 |
| EP | 0 607 617 | 7/1994 |
| EP | 1 873 010 | 1/2008 |
| GB | 964 932 | 7/1964 |
| GB | 964932 | 7/1964 |
| GB | 1 247 849 | 9/1971 |
| GB | 1247849 | 9/1971 |
| GB | 2 183 559 | 6/1987 |
| GB | 2 423 754 | 9/2006 |
| JP | 57 37077 | 3/1982 |
| NZ | 5 397 22 | 8/2007 |
| WO | 90 01432 | 2/1990 |
| WO | 92 18350 | 10/1992 |
| WO | 95 04668 | 2/1995 |
| WO | 97 18970 | 5/1997 |
| WO | 2004 069589 | 8/2004 |
| WO | WO 2004/069589 | 8/2004 |
| WO | 2005 073055 | 8/2005 |
| WO | 2007 145537 | 12/2007 |

OTHER PUBLICATIONS

International Search Report issued May 19, 2009 in PCT/AU08/01907 filed Dec. 24, 2008.

* cited by examiner

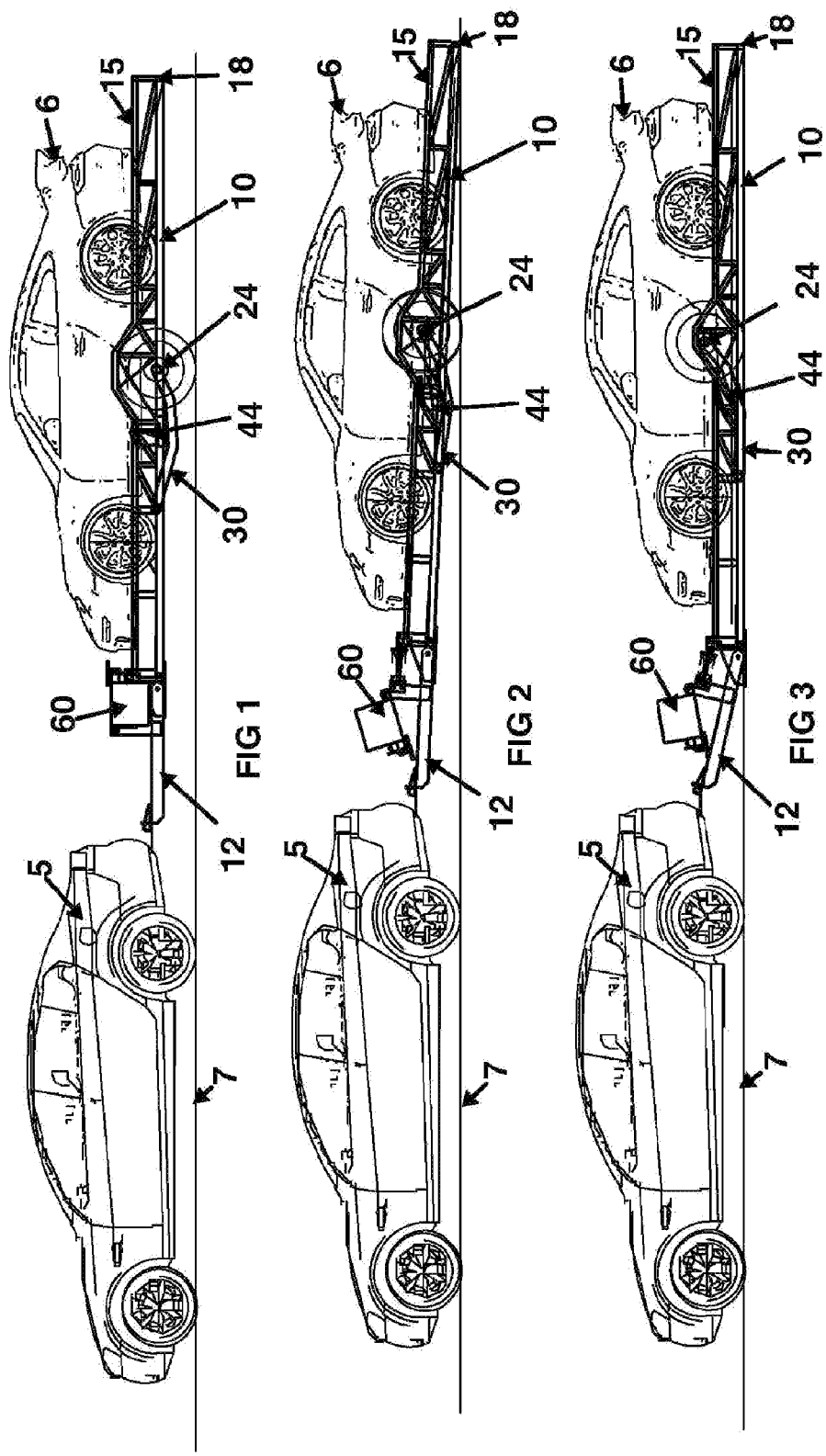

TRAILER WITH LOWERABLE AND RAISABLE TRAILER BED

TECHNICAL FIELD

The present invention relates to trailers and more particularly, but not exclusively to trailers which can be used to transport vehicles. The invention is described herein in relation to trailers for transporting vehicles but the apparatus and method may be used in relation to other types of trailers such as caravans, horse floats or trailers for moving equipment, furniture etc.

BACKGROUND OF THE INVENTION

Trailers are known to be used to transport cars and other vehicles. For example, they can be used to transport racing cars from one place to another. There are various problems associated with the existing trailers.

Generally, existing trailers are provided with ramps that are deployed such that a vehicle can be driven or winched onto the trailer. There is always a chance of damage to the front portion of the vehicle when it is driven or winched onto the trailer because there is not sufficient clearance between the front portion and the ramps. The problem is compounded when loading vehicles which have lower ground clearance such as racing cars.

In some trailers, the trailer beds have an extendable trailing end and the trailing end of the trailer can be extended and lowered such that the trailing end of the trailer provides the slope for the vehicle to be driven or winched onto the trailer. However, generally the trailing end does not touch the ground and there is a clearance between the trailing end and the ground. Once the vehicle is in position on the extended trailing end of the trailer bed, the trailing end is retracted and raised. However, this does not rule out the possibility of damage to the vehicle when being driven or winched since the vehicle still has to overcome the slope. Further, such an extension and tilting arrangement overloads the axle.

Generally, trailers with extendable trailer beds require tandem axles to support the additional weight and tilting action of the extension portion (trailing end). Inclusion of tandem axles adds to the weight of the trailer. Also, tandem axle trailers are difficult to manoeuvre around sharp corners and pose significant problems in transportation.

Further, while loading racing cars onto most existing trailers, it is required to remove the low front spoiler so that damage to the front spoiler is averted. Removing and securing the front spoiler necessitates additional time and efforts of the individuals loading the car. Commonly, more than one individual is required to load and unload the race car from the trailer.

Various lowerable trailers have been proposed. These trailers are thought undesirable because the lowering mechanism impinges upon the available load carrying space and/or results in a wider trailer.

Use of ramps or extendable trailer beds is also inconvenient for other kinds of loads, such as furniture, horses, wheelchairs, tools or machinery, as the load must be manually pushed/lifted (or led) up the ramp or trailing end. This can be both awkward and heavy, and results in increased risk of accidents and lower safety standards, in addition to potentially requiring more people to assist with loading. Caravans are generally provided with folding steps to be climbed by users, which is inconvenient for the elderly or disabled. Ramps may be retrofitted but remain inconvenient.

With the aforementioned in mind, the present invention seeks to alleviate one or more short comings of such known prior art in providing a trailer that reduces the risk of damage to the load (eg vehicle) when loading and unloading, simplifies loading and unloading and improves safety.

Reference to any prior art in the specification, whether in the background section or otherwise, is not, and should not be taken as an acknowledgement or any form of admission that the prior art is common general knowledge.

SUMMARY OF THE INVENTION

A first aspect of the present invention provides a trailer including:
  i) a draw bar;
  ii) a trailer frame supporting a trailer bed;
  iii) an arm, the arm including a first pivot mount;
  iv) an axle, the axle being pivotally connected to the arm at the first pivot mount;
  v) an actuating means, the actuating means being actuatable to exert a force on the arm relative to the trailer frame;
  wherein the axle has at least one associated wheel and the wheel has a plane of rotation in which the wheel rotates when traveling in a forward direction, and the actuating means is located substantially in the plane of rotation;
  whereby the trailer bed may be raised or lowered by exerting a force on the arm relative to the trailer frame.

Advantageously, the trailer bed may be lowered flat to the ground for loading and unloading. This makes the process easier and safer than loading, for example, using a ramp, forklift or other method. It also reduces the likelihood of damage to the load, for example, damage to the spoiler of a race car, as a race car has a low clearance and thus problems with loading up a ramp.

Advantageously, this also allows for a neat and compact system for raising and lowering the trailer, maximising the load carrying space and minimising the outer dimensions of the trailer.

Preferably the first pivot mount is located inwardly of the wheel. Preferably, the actuating means exerts the force on the arm at a location substantially in the plane of rotation.

In one embodiment the actuating means exerts the force on the arm at a location forward of the wheel and in another embodiment the actuating means exerts the force on the arm at a location rearward of the wheel.

In one preferred embodiment the arm is pivotally connected to the axle at a location inwardly of the wheel and the actuating means acts on a portion of the arm at a location substantially in the plane of rotation.

In one preferred embodiment the trailer frame includes a second pivot mount, the arm being pivotally movable relative to the trailer frame about the second pivot mount. Preferably the second pivot mount is located substantially in the plane of rotation. In one embodiment, the actuating means exerts the force on the arm at a location forward of the second pivot mount and in another embodiment the actuating means exerts the force on the arm at a location rearward of the second pivot mount.

In one embodiment of the trailer, the arm has at least two portions which are angled relative to each other when projected on the plane of rotation.

Preferably the arm has at least two portions which are angled relative to each other when projected onto a substantially horizontal plane perpendicular to the plane of rotation.

In another embodiment the arm may have at least a first section and a second section, the first and second sections being in slideable engagement.

In a preferred embodiment the trailer frame includes a third pivot mount located higher than and rearward of the second pivot mount, the actuating means pivotally mounted to the third pivot mount and actuatable to exert a force on the arm resulting in rotation of the arm about the second pivot mount.

In another embodiment the trailer frame includes a fixed point located higher than and forward of the second pivot mount, the actuating means actuatable to exert a force between the fixed point and the arm, resulting in rotation of the arm about the second pivot mount. Preferably the fixed point is provided by a bracket.

Selecting optimal geometry advantageously allows the actuation means to be positioned to obtain maximum leverage, and hence requires less force to raise or lower the trailer.

Preferably the trailer further includes a draw bar pivot mount, the draw bar pivotally connected to trailer frame via draw bar pivot mount.

Advantageously this allows the trailer to be raised or lowered without needing to unhitch the trailer from the towing vehicle, and prevents overloading of the tow vehicle draw bar during loading/unloading.

Preferably the actuating means is a first airbag.

In one embodiment the trailer further includes a spring and an air valve, the valve being operable to deflate first airbag and the spring biasing the draw bar towards a towing position. In an alternative embodiment, the trailer includes a draw bar bracket mounted on the draw bar, a connecting bracket mounted on the trailer frame, and a second airbag extending between the draw bar bracket and the connecting bracket, the second airbag when inflated positioning the draw bar in a towing position. Preferably the first and second airbags have a common first isolating valve and a common venting valve, whereby they are held at a common pressure. This can improve safety and also assists to avoid overloading of the tow bar.

Preferably the trailer further includes brakes associated with the wheel and a safety brake interlock switch operable to prevent the wheel from turning when the draw bar is not in a towing position. This can also improve safety.

Another aspect of the invention provides a trailer including: a draw bar; a trailer frame; a wheel carrying structure pivotally connected to the trailer frame and carrying at least one wheel; and an actuator actuatable to exert an at least approximately vertical force on the wheel carrying structure, at a location fore or aft of the pivotal connection between the wheel carrying structure and the trailer frame, to raise or lower the trailer frame; wherein the wheel has a plane of rotation in which the wheel rotates when traveling in a forward direction, and the actuating means is located substantially in the plane of rotation.

Another aspect of the invention provides a trailer including: a draw bar; a trailer frame; a wheel carrying structure carrying at least one wheel; and an airbag pivotally mounted to the trailer frame actuatable to exert a force on the wheel carrying structure to raise or lower the trailer frame.

Another aspect of the invention provides a trailer including: a draw bar; a trailer frame; and at each side of the trailer a wheel carrying structure carrying at least one wheel and a pneumatic actuator to exert a force on the wheel carrying structure to raise or lower the trailer frame; wherein each pneumatic actuator is isolated for stability of the trailer while towing.

BRIEF DESCRIPTION OF THE DRAWINGS

Other features and advantages of one or more preferred embodiments of the present invention will be readily apparent to one of ordinary skill in the art from the following written description with reference to and, used in conjunction with, the accompanying drawings showing preferred embodiments of the invention, in which:

FIG. 1 shows a side view of a towing vehicle with a trailer according to a first embodiment of the invention in the towing position; and FIG. 2 shows a side view of a towing vehicle with trailer according to the embodiment of FIG. 1 in an intermediate unloading position; and FIG. 3 shows a side view of a towing vehicle with trailer according to the embodiment of FIG. 1 in a lowered or unloading position.

DESCRIPTION OF PREFERRED EMBODIMENT

FIGS. 1 to 3 show side views of a towing vehicle (5) together with a trailer (10) according to a first embodiment of the invention. FIG. 1 shows the trailer (10) in the towing position, FIG. 2 shows the trailer (10) in an intermediate position and FIG. 3 shows the trailer (10) in a loading position, for loading or unloading a race car (6). It is noted that the trailer (10) is suited to carrying many other types of loads in a similar manner.

Figure 4:
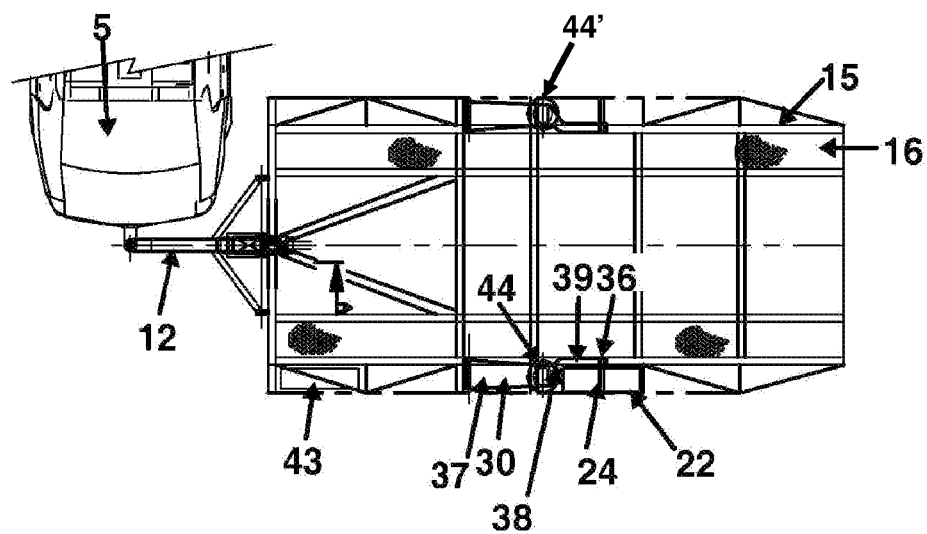
FIG. 4 shows a top plan view of a towing vehicle with trailer according to the embodiment of FIG. 1.

FIG. 4 shows a plan view of the trailer of FIGS. 1 to 3. Referring to FIGS. 1 to 4, the trailer (10) includes a trailer frame (15) which supports a trailer bed (16) upon which a load, race car (6), rests. A draw bar (12) connects the trailer frame (15) to a towing vehicle (5). The trailer (10) further includes a stub axle (24) having an associated wheel (22). The trailer (10) shown in FIGS. 1 to 4 has one pair of wheels mounted on stub axles, however other wheel arrangements such as tandem axles lie within the scope of the invention.

To load or unload the trailer (10), the trailer bed (16) is advantageously lowered substantially level with the ground (7), as shown in FIG. 3. This lowering action is enabled by a raising and lowering mechanism that includes a pivoting arrangement between axle (24) and trailer frame (15). The ability to lower the trailer (10) to a position substantially level with the ground (7) without disconnecting draw bar (12) from towing vehicle (5) is enabled by a pivoting arrangement between draw bar (12) and trailer frame (15). The draw bar (12) is connected to and triangulated to the front or forward end of the trailer frame (15)—unlike prior art trailers where the draw bar triangulation may extend below the frame (15). This advantageously allows the trailer frame (15) to be lowered to the ground (7) as the draw bar triangulation is not in the way. Use of the term 'lay-flat' indicates that the trailer is lowered to achieve a substantially horizontal orientation of the trailer bed at a height substantially level with the (horizontal) ground. Substantially level with the ground includes circumstances where the trailer 10 retains a small clearance between the underside of the trailer bed and ground but which still allow for normal walking or rolling of loads onto the trailer bed without making an effort such as lifting or stepping up a step.

Hence, as shown in FIGS. 1 to 3, the trailer (10) may be lowered from the towing position of FIG. 1 to the intermediate position of FIG. 2, in which the rear end of trailer (10) rests substantially level with or on the ground (7). As illustrated, a vehicle may be loaded or unloaded in this intermediate position, however, according to preferred forms of the invention, the trailer (10) may then be lowered to the loading position of FIG. 3. In the loading position of FIG. 3, the front end of trailer (10) also rests substantially level with or on the ground (7). The trailer (10) may be conveniently loaded or unloaded and the process carried out in reverse to raise the trailer (10) into the towing position of FIG. 1.

Figure 5:
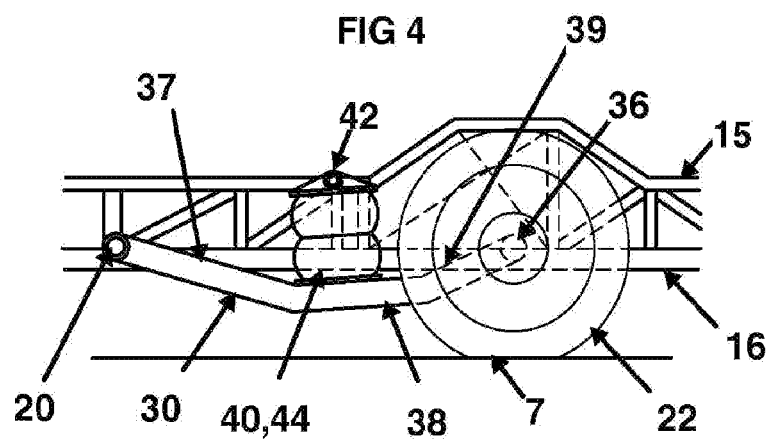
FIG. 5 shows a side view of a portion of the trailer according to the embodiment of FIG. 1 in a raised or towing position.
Figure 6:
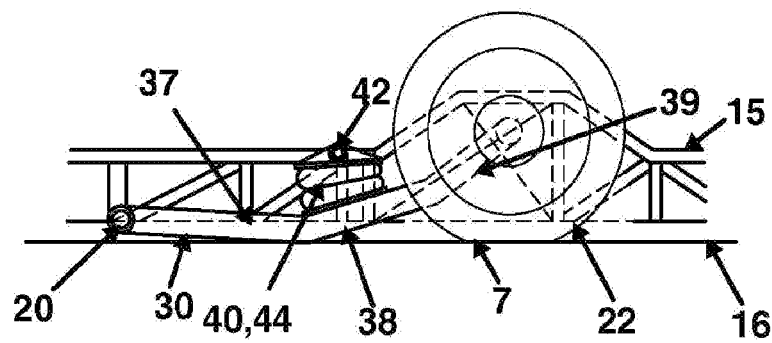
FIG. 6 shows a side view of a portion of the trailer according to the embodiment of FIG. 1, in the lowered or unloading position.

FIGS. 5 and 6 show side views of a part of the trailer (10) of FIGS. 1 to 4. The pivoting arrangement provided on the left side of the trailer (10) between axles (24) and trailer frame (15) is provided by a wheel carrying structure in the form of arm (30) which includes a first pivot mount (36) to which axle (24) is pivotally connected. The left side including airbag (44) will be described below, however it is noted a mirror image arrangement provided on the right side of the trailer including airbag (44') is also shown in FIG. 4. However a mirror image arrangement is not essential. The trailer frame (15) includes a second pivot mount (20) to which the arm (30) is pivotally connected. It is noted that the pivot mounts mentioned herein could be holes, recesses, rods, pins, bars, etc which allow for pivotal connection. Wheel (22) rests upon ground (7) and has a plane of rotation in which the wheel (22) rotates when the wheel (22) and trailer (10) are travelling in a forward direction, i.e. a vertical plane extending in the direction from the front to the rear of the trailer.

Use of the term 'in-line' in this document refers to something located, positioned or acting at a point that is in-line with one of the trailer wheels, that is, located positioned or acting at a point on the plane of rotation in which the wheel rotates when travelling in a forward direction. Use of the terms 'in-line' or 'plane of rotation of the wheel' is not to indicate or restrict to a specific one of many parallel planes of rotation, but rather is to include any one of the many parallel planes of rotation of the wheel, as the wheel has a thickness resulting in, for example, an inner side plane of rotation, a centre-line plane of rotation and an outer-side plane of rotation. The wheel also has a plurality of other parallel planes of rotation.

Figure 7:
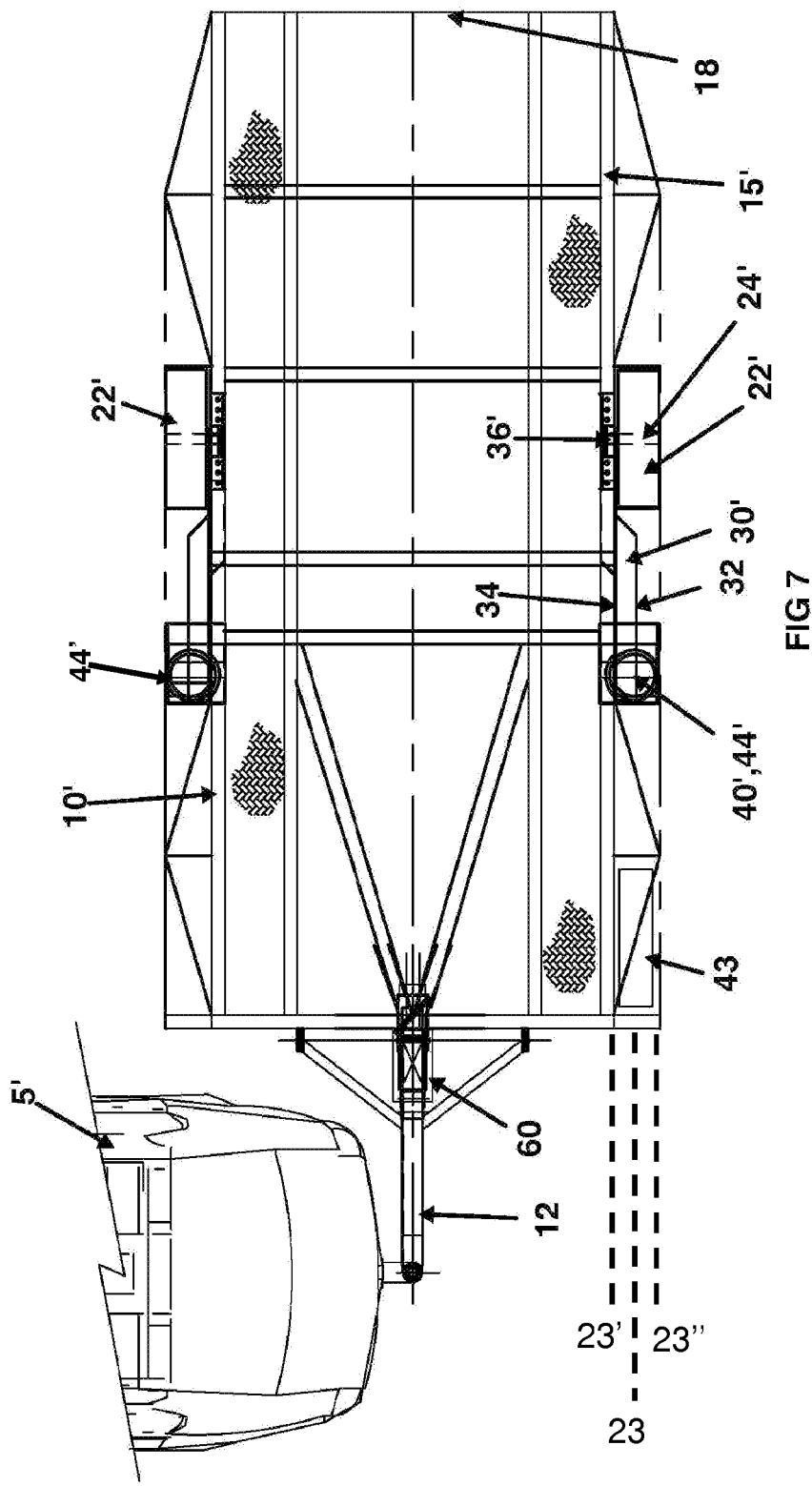
FIG. 7 shows a top plan view of a towing vehicle with trailer according to another embodiment of the invention.

Inner-side (23'), centreline (23) and outer-side (23") planes of rotation are partially shown in plan view in FIG. 7 as dotted lines extending from the forward end of the trailer (10'), in line with the wheel (22'). On some trailers (not shown) the wheels may be steerable, or mounted on an axle that can pivot in response to turning corners or the like. In such a case, while actually turning the corner or being steered, the plane of rotation of the wheel is not the same plane of rotation in which the wheel rotates when travelling in a forward direction, as the trailer is not travelling in a forward direction (i.e. straight ahead) but rather is travelling around a corner. Unless context indicates otherwise, the 'plane of rotation of the wheel' is the plane in which the wheel rotates when the trailer is travelling in a forward direction, straight ahead. Referring again to FIGS. 5 and 6, the height of trailer frame (15) relative to the wheel (22) and ground (7) may be adjusted via the pivoting of arm (30) relative to axle (24) and trailer frame (15). For the left hand side, as viewed in the side views of FIGS. 5 and 6, the arm (30) rotates counter-clockwise about the second pivot mount (20) as the trailer is lowered from the view of FIG. 5 to the view of FIG. 6, and rotates clockwise about the second pivot mount (20) as the trailer is raised.

The use of the term "trailer frame" herein includes components of equivalent function for trailers not having a chassis, for example "non-chassis caravans" in which various components may serve a double purpose, e.g. act as both a side wall panel and as a part of the frame or structure supporting the trailer bed (or floor of a caravan).

As shown in FIG. 4, the end of the arm (30) connected by first pivot mount (36) to the axle (24) is disposed inwardly of the wheel (22), and the other end of the arm (30) connected to the second pivot mount (20) is disposed in-line with the wheel, i.e. in the plane of rotation of the wheel (22).

In one embodiment the arm (30) has at least two portions which are offset from and preferably angled relative to each other when projected on the plane of rotation of the wheel (22). This projection showing the relative offset and angles may be as viewed in FIGS. 4 to 6.

The embodiment of FIGS. 1 to 6 has an arm (30) having a first portion (37), a second portion (38) and third portion (39). Each portion is angled relative to the other two portions when projected onto the plane of rotation, as shown in the side views of FIGS. 5 and 6. However, the arm could extend in a 'straight' line when projected onto the plane of rotation.

The first portion (37) is pivotally connected via the second pivot mount (20) to trailer frame (15). The third portion (39) is pivotally connected via the first pivot mount (36) to the axle (24).

The trailer frame (15) includes a third pivot mount (42) to which an actuating means (40) is pivotally mounted. The actuating means (40) is an inflatable airbag (44) which could be run by an air compressor (43). The air compressor (43) may conveniently be stored or positioned in-line with wheel (22) that is, at a location substantially in the plane of rotation of the wheel. Alternative actuating means including mechanical, other pneumatic or hydraulic actuators could also be used. The airbag (44) may be actuated to exert a force between the second portion (38) of arm (30) and the trailer frame (15) at a location substantially in the plane of rotation of the wheel.

In the embodiment shown in FIGS. 4 to 6, the lower end of the airbag is fixed to second portion (38) and hence in a given actuation position the airbag (44) maintains a fixed distance between the second portion (38) and the third pivot mount (42). Hence, the angle at which the first portion (37) is mounted at the second pivot mount (20) is also fixed, as the second pivot mount (20) and third pivot mount (42) are both mounted on trailer frame (15) and in fixed positions relative to each other. (In alternative embodiments, not shown, the airbag is not fixed to the arm, it instead maintains a minimum distance between the arm and pivot mount, rather than a fixed distance.)

In the embodiment of FIGS. 4 to 6, as the arm (30) is held at a fixed angle (for a given actuation position) at second pivot mount (20), the third portion (39) of the arm is also held at a fixed position relative to the trailer frame (15). Thus the trailer frame (15) is maintained in a fixed position relative to the axle (24). The axle (24) is mounted to arm (30) via the first pivot mount (36) and the wheel (22) is mounted to the axle (24) and hence the trailer frame (15) is maintained in a fixed position relative to ground (7) upon which wheel (22) is supported (for a given actuation position). Referring to FIG. 5, the actuation position of the airbag (44) is the extended position and the trailer frame (15) is held clear of the ground (7) in the towing position. Referring to FIG. 6, the actuation position of the airbag (44) is the retracted position and the trailer frame (15) rests substantially level with the ground (7). The airbag (44) passes through intermediate actuation positions as the trailer (10) is raised or lowered. The shape of arm (30), having three portions inclined (when projected onto the plane of rotation) to form a "curved" arm, advantageously provides additional space in which to position the actuating means, when compared to an arm which extends in a straight line. This enables the neat and convenient packaging of the raising and lowering mechanism in the vertical direction. In the embodiment shown in FIGS. 1 to 6, the raising and lowering mechanism (including arm 30 and actuation means 40) does not protrude above the top of wheel (22).

Nor does the raising and lowering mechanism protrude below trailer frame (15) when in the lowered position. Thus the trailer (10) may lay flat to the ground as the arm (30) and actuation means (40) move out of the way as the trailer is lowered. In the embodiment of FIGS. 1 to 6, the actuation means (40) being airbag (44) is fixed to third pivot mount (42) on frame (15). Third pivot mount (42) is located on frame (15) at a point which is higher and rearward of the second pivot mount (20). The height of the airbag (44) in its retracted position, the height difference on frame (15) of third pivot mount (42) and second pivot mount (20) and the distance rearward of third pivot mount (42) from second pivot mount (20), in combination with the "curvature" of arm (30) may be selected to create a suitable geometry in which inflating the airbag (44) to an extended position causes the frame (15) to be raised a suitable distance into the towing position.

The third pivot mount (42) is located with sufficient height above the lower surface of the trailer frame/bed 15, 16 and thus the top of actuation means (40) does not interfere with laying the trailer flat. In the embodiment shown the third pivot mount (42) is on a side member of frame (15). The bottom of actuation means (40) can move clear of the ground (7) to allow the lay flat position as the bottom of actuation means (40) rests upon or is connected to the arm (30) and the arm (30) rotates out of the way of the ground (7) as the trailer (10) is laid flat. The airbag (44) will not interfere with the load as it is located to the side of the main or useful load carrying area in a position in-line with the wheel (22).

Desirably the arm (30) has at least two portions which are offset from and preferably angled relative to each other when projected onto a horizontal plane perpendicular to the plane of rotation ie a horizontal plane. This projection showing the offset and relative angles may be viewed in the plan view of FIG. 4. The embodiment of FIGS. 1 to 6 has three portions, with the two end portions angled relative to the middle portion. The two end portions are not angled relative to each other but are offset. It would be possible to provide an arm having two offset portions connected directly to each other, without an angled middle portion.

The neat and convenient packaging of the raising and lowering mechanism is also improved by the shape of arm (30) when projected onto the plane perpendicular to the plane of rotation. Referring to the plan view of FIG. 4, the arm (30) has a first portion (37) positioned in line with the wheel (22), ie on the plane of rotation, a second portion (38) on which the airbag (44) exerts a force, the second portion (38) angled relative to the first portion (37) and a third portion (39) parallel to but offset from the first portion (37), onto which the wheel (22) is mounted via first pivot mount (36). Hence, the raising and lowering mechanism has minimal impact on the overall width of the trailer (10) or the available or useable space on trailer bed (16), as part of the mechanism is positioned in the plane of rotation, ie in line with the wheel (22). In particular the relatively bulky airbag (44) is positioned in line with the wheel (22).

The National Code of Practice for building small trailers in Australia specifies that the maximum width of trailers used for carrying cars must not be greater than 2.5 metres. This restriction on the maximum width of the trailers means that any added features to overcome prior art problems should not increase the overall width of the trailer, and desirably should also not adversely affect available useful load space.

Figure 8:
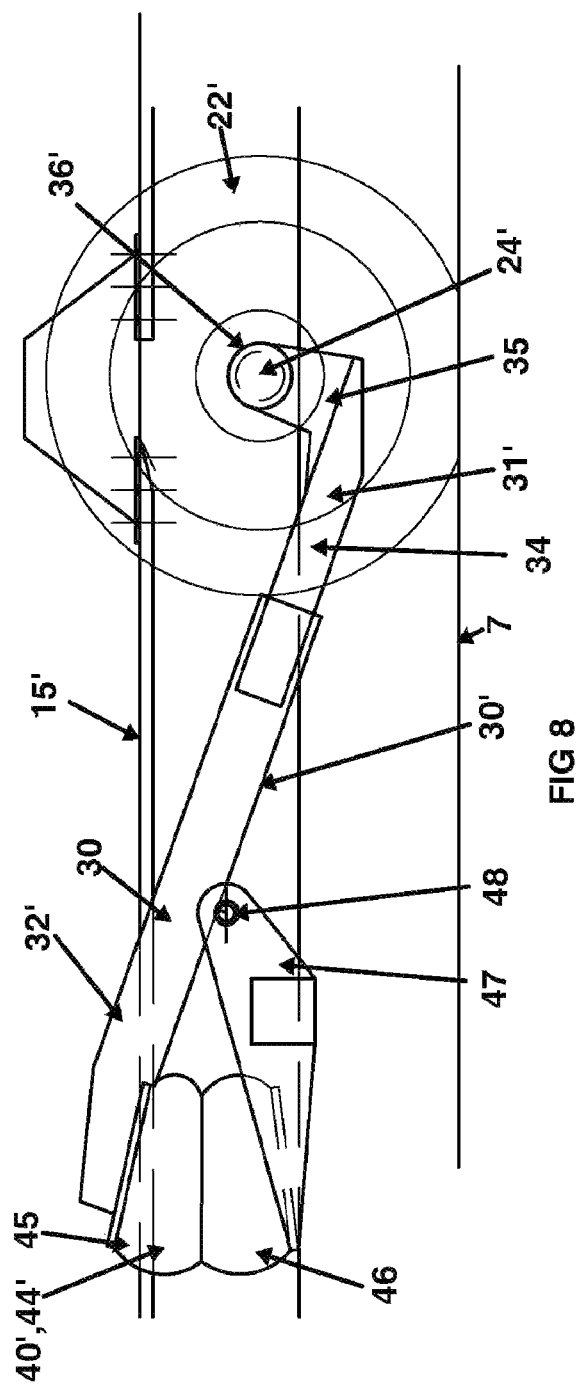
FIG. 8 shows a side view of a portion of the trailer of FIG. 7, in the raised or towing position.
Figure 9:
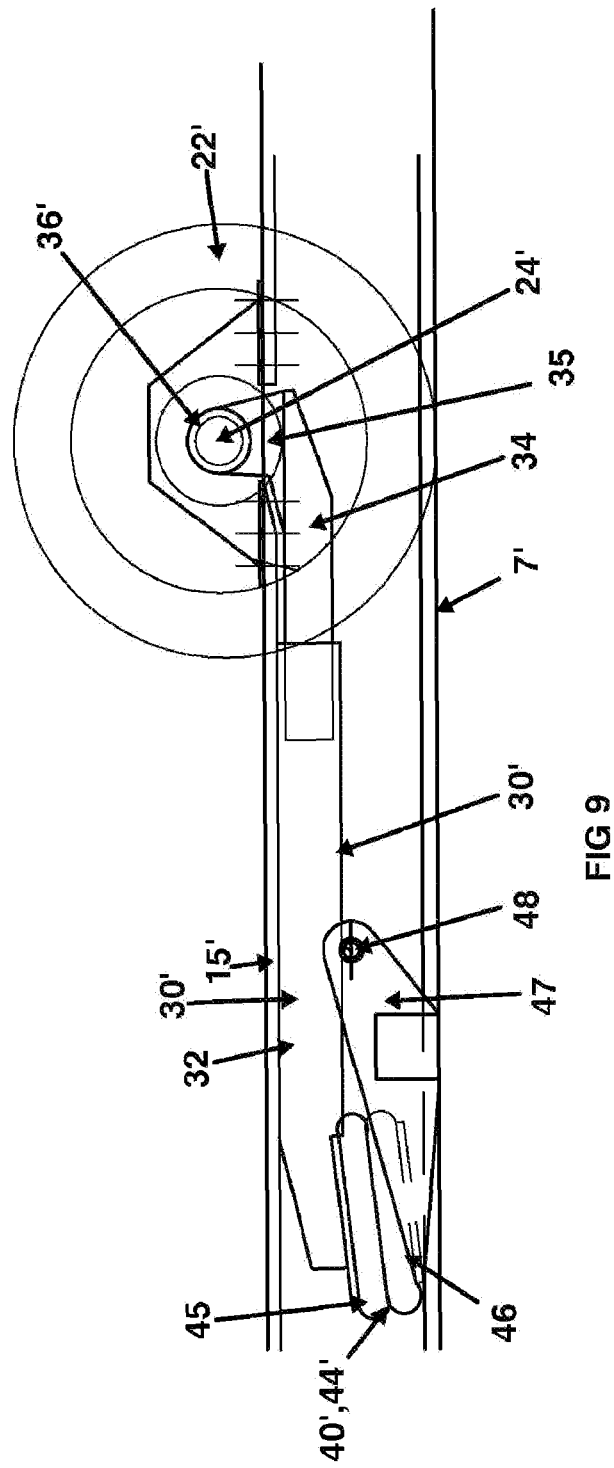
FIG. 9 shows a side view of a portion of the trailer of FIG. 7, in the lowered or unloading position.

In an alternative embodiment, as shown in FIGS. 7 to 9, the actuation means (40') is positioned in an alternative location. The pivoting arrangement between axle (24') and trailer frame (15') is provided by arm (30') which includes first pivot mount (36') to which axle (24') is pivotally connected. The trailer frame (15') includes a second pivot point in the form of a pin, rod or bar (48). The pivot point could be provided in other forms in alternative embodiments. The arm (30') rests upon the pin (48) and may slide and rotate relative to the pin (48). In the embodiment of FIGS. 7 to 9, the trailer frame (15') includes a bracket (47) which is connected to the trailer frame (15') by pin (48) and held in fixed position relative to the trailer frame (15'). However, it is noted that the bracket (47) could be welded or otherwise connected to the trailer frame (15) in alternative embodiments, without contacting the pivot point ie pin (48).

The bracket (47) supports actuation means (40') being an airbag (44'). The airbag (44') may be actuated to exert a force on a first section (32) of arm (30') relative to the trailer frame (15'). In the embodiment shown in FIGS. 8 and 9 the lower end of airbag (44') is fixed to bracket (47) and hence in a given actuation position the airbag (44') maintains a fixed distance between the first section (32) and the bracket (47). Hence, the angle at which the arm (30') rests upon the pin (48) is also fixed. As the arm (30') rests on pin (48) at a fixed angle (for a given actuation position), the arm (30') is also held at a fixed position relative to trailer frame (15'). Thus the trailer frame (15) is maintained in a fixed position relative to the axle (24'). The axle (24') is mounted to arm (30') via the first pivot mount (36') and the wheel (22') is mounted to the axle (24') and hence the trailer frame (15') is maintained in a fixed position relative to ground (7') upon which wheel (22') is supported. The raising and lowering mechanism including arm (30) and actuation means (40') does not protrude below trailer (10) when in the lowered position, allowing the trailer to lay flat. In this embodiment, this has been achieved by providing a fixed point (bracket 47) on which actuation means 44' acts and does not protrude substantially below the trailer (10). In the lowered position of FIG. 9, the trailer has been lowered substantially level with the ground 7' but retains a small clearance between trailer and ground. This still enables a load to easily walk or roll onto the trailer bed but may be desirable for usage situations where the ground 7' itself is not level and even. The trailer is supported by the wheel and bracket (47) with a small clearance between the ground (7) and trailer bed (16). Any unevenness of the ground will be less likely to transmit a point load through an inappropriate location e.g. the centre of the trailer bed.

The arm (30') of FIGS. 7 to 9 may be a rigid single piece arm, or it could include a first section (32) and a second section (34) which can slide relative to each other. In one embodiment of FIGS. 7 to 9, the first and second sections (32, 34) are arranged in sliding engagement, and it is the first section (32) which rests on pin (48). However, the sliding engagement could be arranged such that the second section (34) rests on the pin (48). The sliding engagement could be telescopic.

When projected onto the plane of rotation of the wheel (22'), the first section (32) and second section (34) form a straight line. The first section (32) of the arm is disposed substantially in the plane of rotation of the wheel, and the second section (34) extends alongside the first section (32) in a plane parallel to and inwardly of the plane of rotation of the wheel. The arm (30') includes a third section (35) angled relative to the second section (34). The third section (35) includes pivot mount (36') to which axle (24') is connected, and is disposed inwardly of the wheel (22').

The airbag (44') may be actuated to exert force on the first section (32) and, as the angle at which first section (32) rests on pin (48) is adjusted by this actuation, the first section (32) may slide relative to pin (48) and relative to second section (34). As the angle at which the first section (32) rests on pin (48) is adjusted, so is the angle of third section (35) relative to the first pivot mount (36').

Referring to the plan view of FIG. 7, the shape of arm (30') when projected onto the plane perpendicular to the plane of rotation is shown. Similarly to the embodiment of FIG. 4, the arm (30') has a first section (32) on which the airbag acts positioned in line with the wheel (22'), ie on the plane of rotation, a second section (34) and a third section (35) offset from the first section (32) and pivotally connected to the axle (24') at a location inwardly of the wheel (22'). Hence the raising and lowering mechanism has minimal impact on the overall width of the trailer (10') or the available or useable space on trailer bed (16').

To enable the trailer (10) to be raised or lowered without disconnecting the trailer (10) from the towing vehicle (5), a pivoting arrangement may be provided between draw bar (12) and trailer frame (15). Referring to FIGS. 10 to 14, there is shown a first embodiment of such an arrangement, including a draw bar (12) having a front or first end (13) which may be connected to a towing vehicle via hitch mechanism (11). The draw bar (12) has a rear or second end (14) which includes draw bar pivot mount (71). The trailer frame (15) is pivotally connected to the draw bar (12) via draw bar pivot mount (71). As shown in the towing position of FIG. 10, trailer frame (15) has a connecting bracket (70) into which the end (14) of draw bar (12) is received and to which it is pivotally connected via draw bar pivot mount (71). The connecting bracket (70) supports draw bar (12) in a horizontal position and limits the range of rotation, or degree to which the draw bar (12) may be pivoted, relative to the trailer frame (15).

An onboard air compressor system may be provided and as shown in FIGS. 4 and 7, an air compressor 43, 43' may be located in line with wheel 22, 22', as may an accumulator compartment.

Preferably the air compressor (43) and hence airbag (44) is operated using controls located on or near draw bar (12). The airbag (44) may be operated or inflated to standard pressures such as 70-90 psi.

Figure 10:
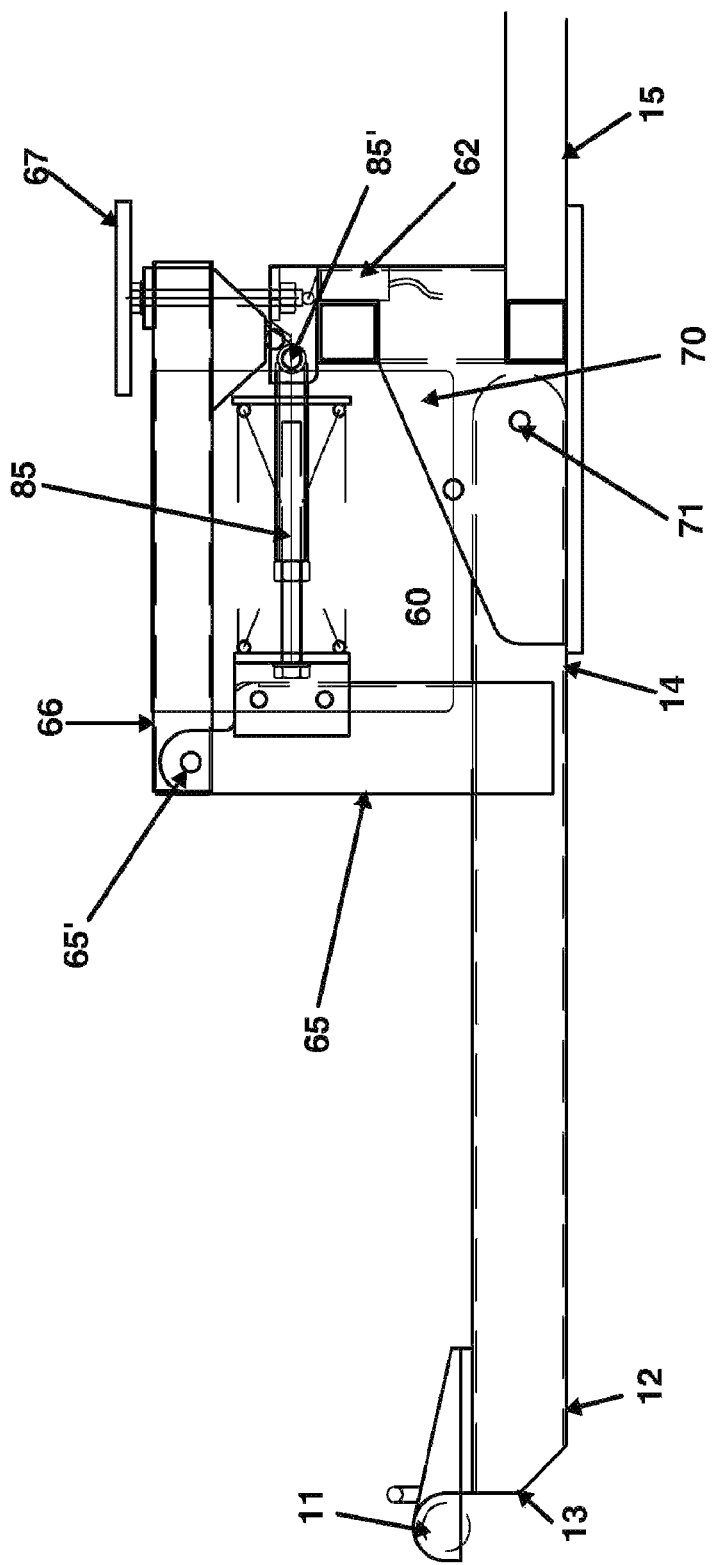
FIG. 10 shows a side view of a draw bar arrangement for a trailer according to an embodiment of the invention, in the raised or towing position.
Figure 11:
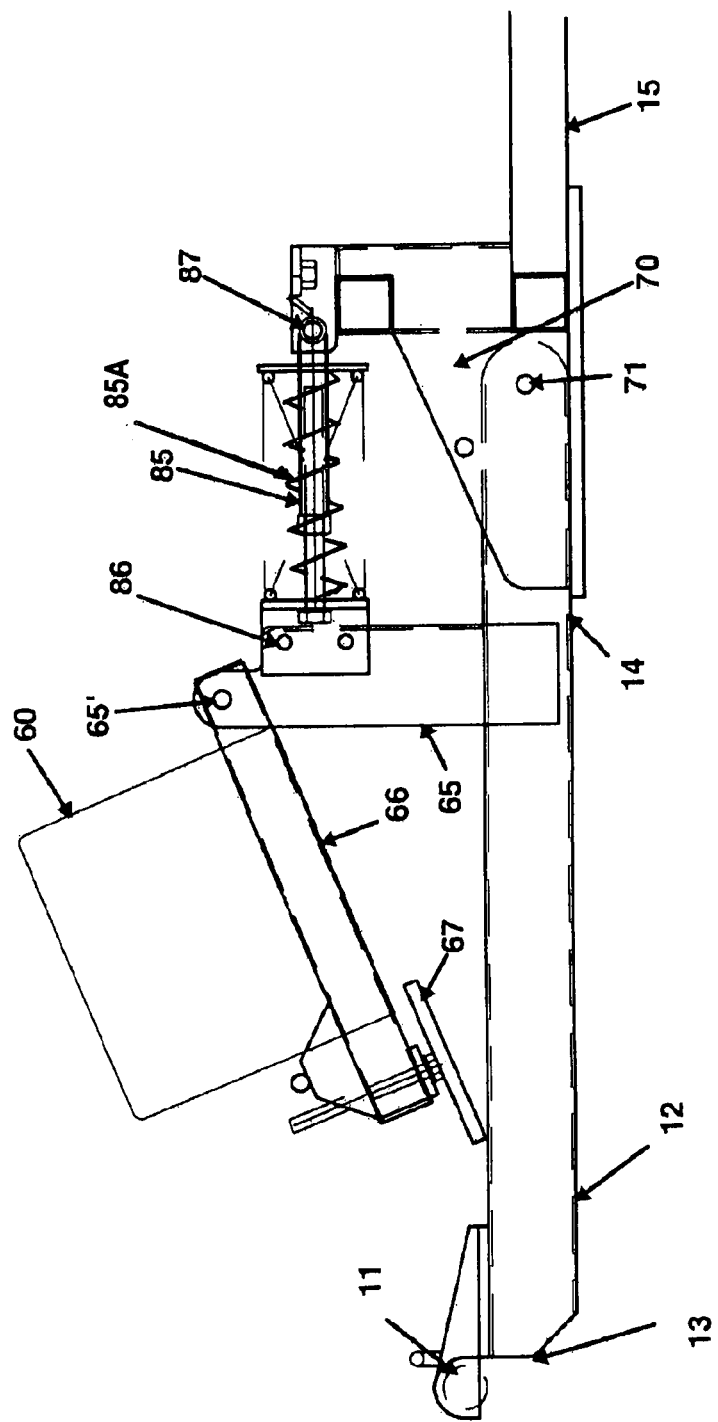
FIG. 11 shows a side view of the draw bar arrangement of FIG. 10 in a position corresponding to FIG. 2.

Shown in FIG. 10 is part of trailer frame (15) connected via connecting bracket (70) and pivot mount (71) to draw bar (12). Mounted on draw bar (12) is a draw bar bracket (65) having bracket pivot mount (65'). A clamp bar (66) is pivotally connected to the draw bar bracket (65) via bracket pivot mount (65'). Clamp bar (66) supports a cover or housing (60) which may be opened by rotating about pivot mount (65') to allow access to the controls of controlling the air compressor (43). To open the cover (60), a T-bolt (67) may be loosened to release clamp bar (66) from connecting bracket (70). The clamp bar (66), brackets (65, 70) and T-bolt (67) thus together constitute a releasable mechanism for rigidly locking the draw bar (12) in its towing position. FIG. 10 shows the raised or towing position, with the cover (60) in the closed position. In FIG. 11, the cover (60) has been opened and a safety brake interlock switch (62) thereby closes, providing supply to the trailer brakes associated with wheel (22) to prevent movement of the trailer (10). Preferably the safety brake interlock switch closes when T-bolt (67) is loosened.

Supported between draw bar bracket (65) and connecting bracket (70) is a spring air valve (85) which may be opened to release air from the airbag (44).

Valve (85) is pivotally connected to draw bar bracket (65) at a first valve pivot mount (86) and pivotally connected to connecting bracket (70) at a second valve pivot mount (87). The spring air valve (85) including a spring (85A) is provided as an assembly but could be provided as a separate spring and separate valve.

Figure 12:
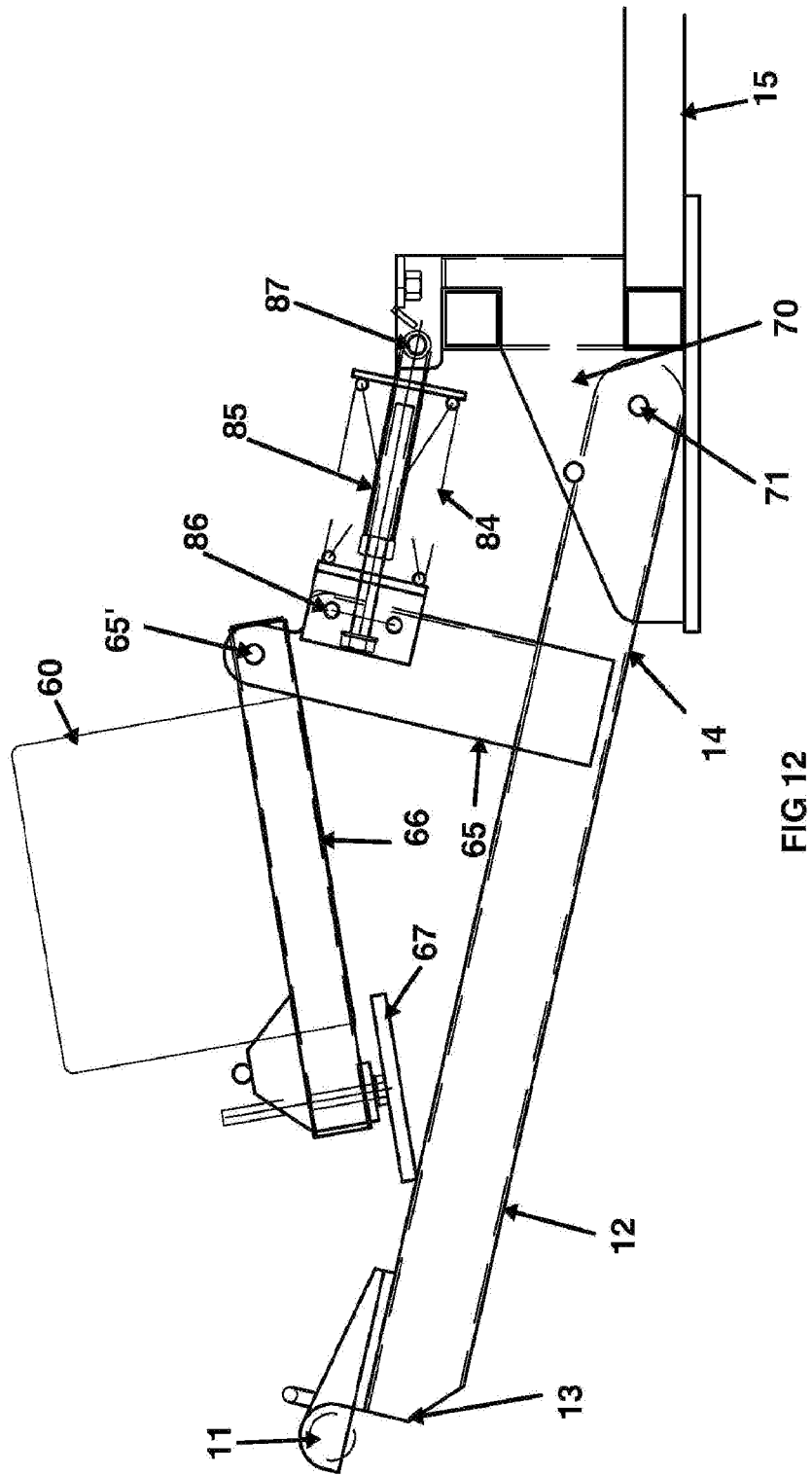
FIG. 12 shows a side view of the draw bar arrangement of FIG. 10 in the lowered or unloading position.

An air connecting line (not shown) connects the valve (85) to the air compressor (43) and accumulator compartment and hence to airbag (44). As shown in FIG. 12, as air is bled from airbag (44) via valve (85), trailer frame (15) is lowered (hitching mechanism (11) remains at its original height) and draw bar (12) pivots clockwise about draw bar pivot mount (71). At the same time, valve (85) pivots about the valve pivot mounts (86, 87).

The spring (84) in spring air valve (85) acts to try to counteract this clockwise pivoting of the draw bar (12). This safety feature biases the draw bar (12) towards a safer 'towing' position should T-bolt (67) and clamp bar (66) not be correctly engaged such that the draw bar (12) is horizontal and fixed in relation to trailer frame (15).

Once the trailer bed (16) has been lowered to the ground (7) the load (6) may easily be removed. To raise the trailer back to the towing position, airbag (44) is re-inflated from an air source such as a bottle, air compressor or accumulator chamber. As air bag (44) is inflated, draw bar (12) returns to a horizontal position and cover (60) may be replaced, clamped using clamp bar (66) and T-bolt (67) fastened and safety interlock disengaged.

Figure 13:
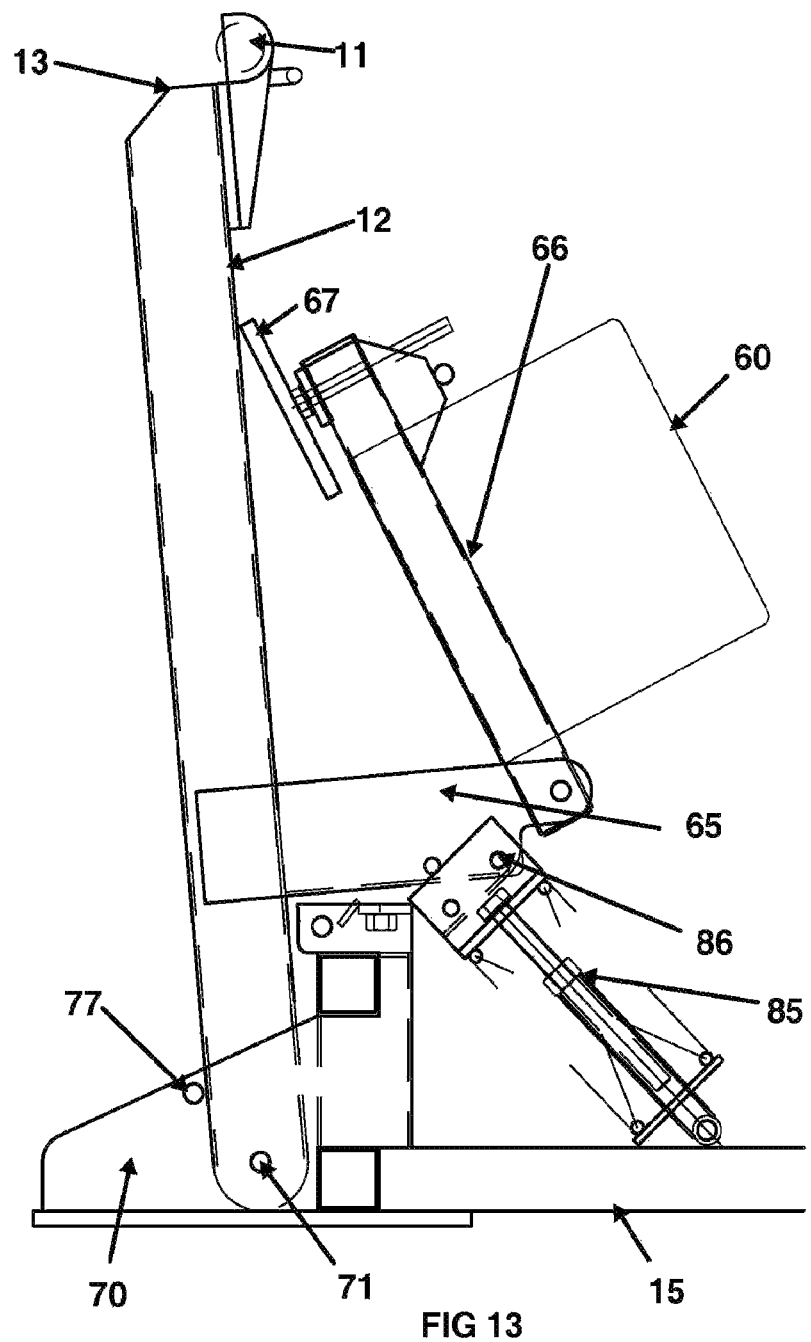
FIG. 13 shows a side view of the draw bar arrangement of FIG. 10 in an upright position for parking or storage.

FIG. 13 shows a draw bar (12) stowed in an upright position, allowing for an unhitched trailer to be positioned in a smaller area. This is useful for storage of the trailer (eg in a garage) or for parking the trailer at a race event, whether or not the race car remains loaded. The spring air valve (85) is disconnected from the connecting bracket (70). Provision of hole (77) provides convenient method of locking draw bar (12) in an upright position by insertion of a pin (not shown) to hold the draw bar (12) in place.

Figure 16:
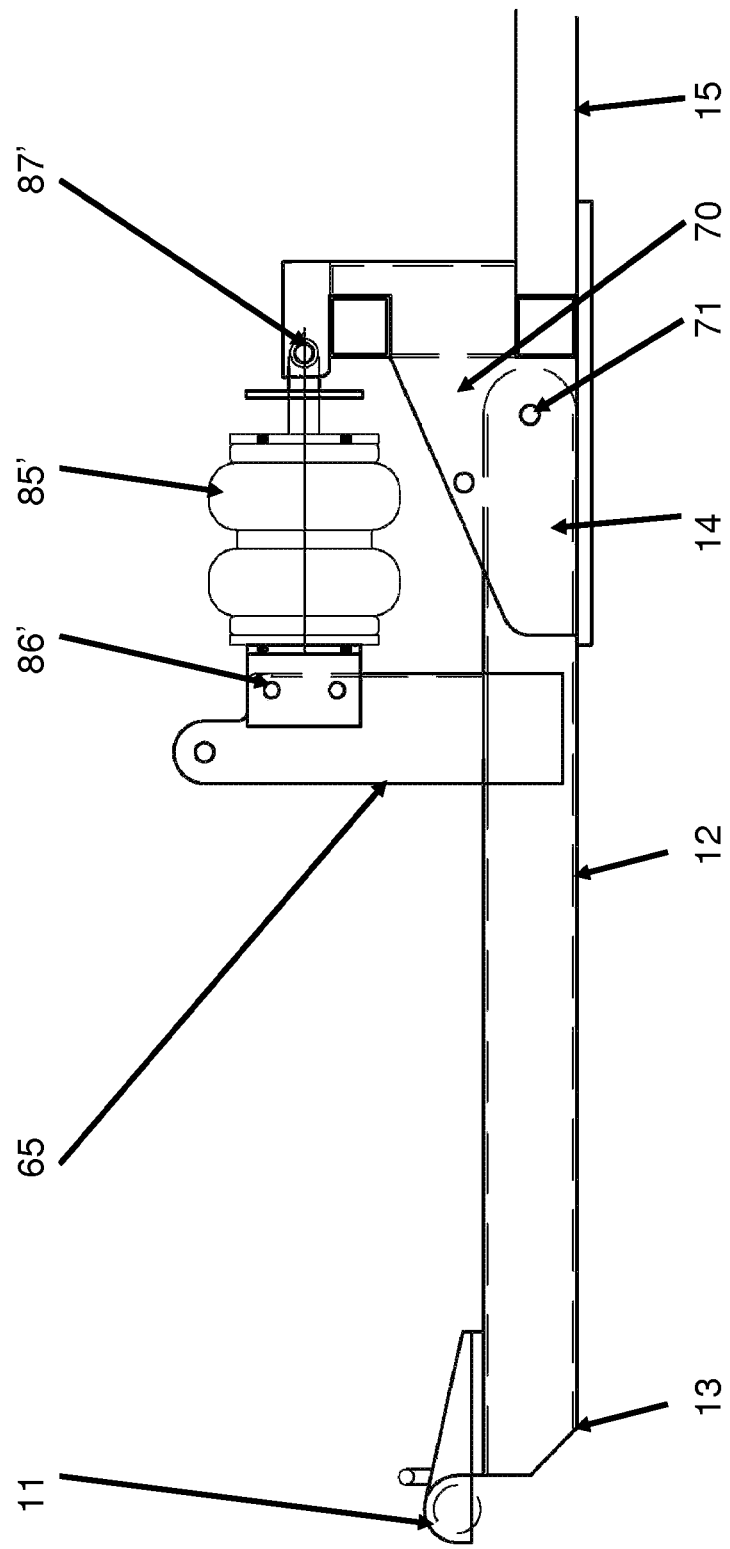
FIG. 16 shows a side view of a draw bar arrangement for a trailer according to another embodiment of the invention, in the raised or towing position.
Figure 17:
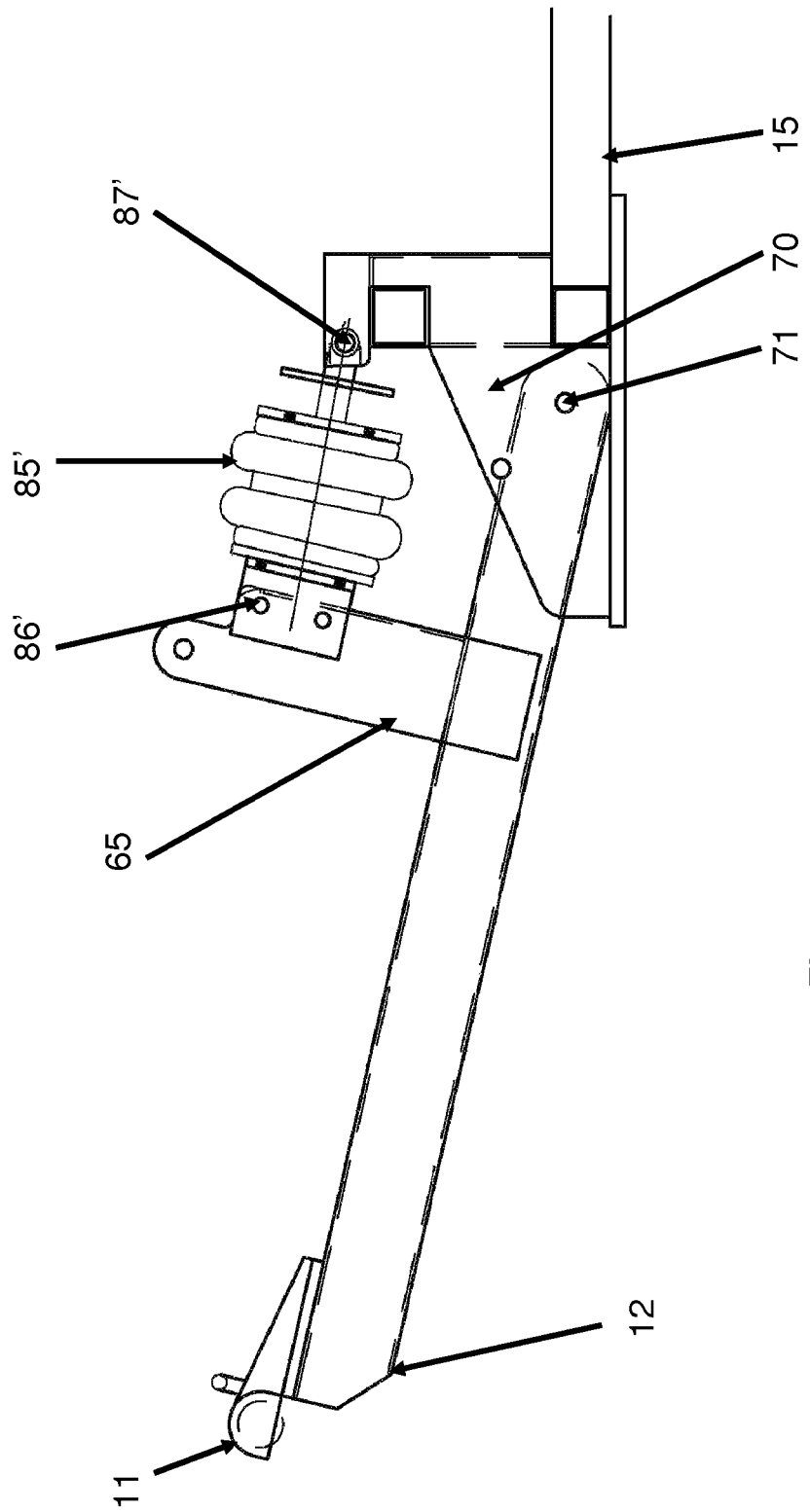
FIG. 17 shows a side view of the draw bar arrangement of FIG. 16 in the lowered or unloading position.
Figure 18:
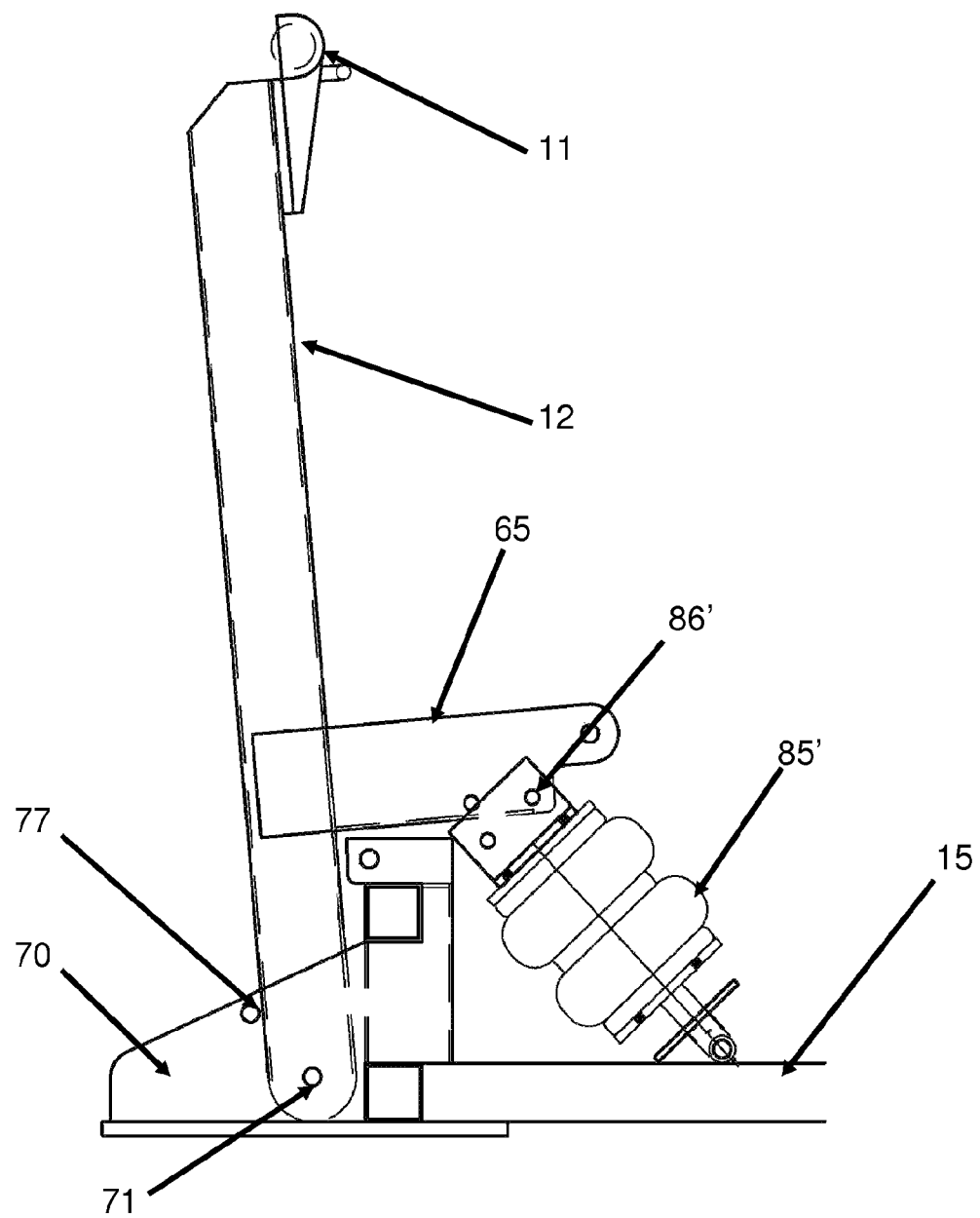
FIG. 18 shows a side view of the draw bar arrangement of FIG. 16 in an upright position for parking or storage.

A preferred second embodiment of a pivoting arrangement may be as shown in FIGS. 16 to 18. There is shown a draw bar (12) having a front or first end (13) which may be connected to a towing vehicle via hitch mechanism (11). The draw bar (12) has a rear or second end (14) which includes draw bar pivot mount (71). The trailer frame (15) is pivotally connected to the draw bar (12) via draw bar pivot mount (71). As shown in the towing position of FIG. 16, trailer frame (15) has a connecting bracket (70) into which the end (14) of draw bar (12) is received and to which it is pivotally connected via draw bar pivot mount (71). The connecting bracket (70) supports draw bar (12) in a horizontal position and limits the range of rotation, or degree to which the draw bar (12) may be pivoted, relative to the trailer frame (15).

An onboard air compressor system may be provided and as shown in FIGS. 4 and 7, an air compressor 43, 43' may be located in line with wheel 22, 22', as may an accumulator compartment.

Preferably the air compressor (43) and hence airbag (44) is operated using controls located on or near draw bar (12). The airbag (44) may be operated or inflated to standard pressures such as 70-90 psi.

Shown in FIG. 16 is part of trailer frame (15) connected via connecting bracket (70) and pivot mount (71) to draw bar (12). Mounted on draw bar (12) is a draw bar bracket (65).

Figure 19:
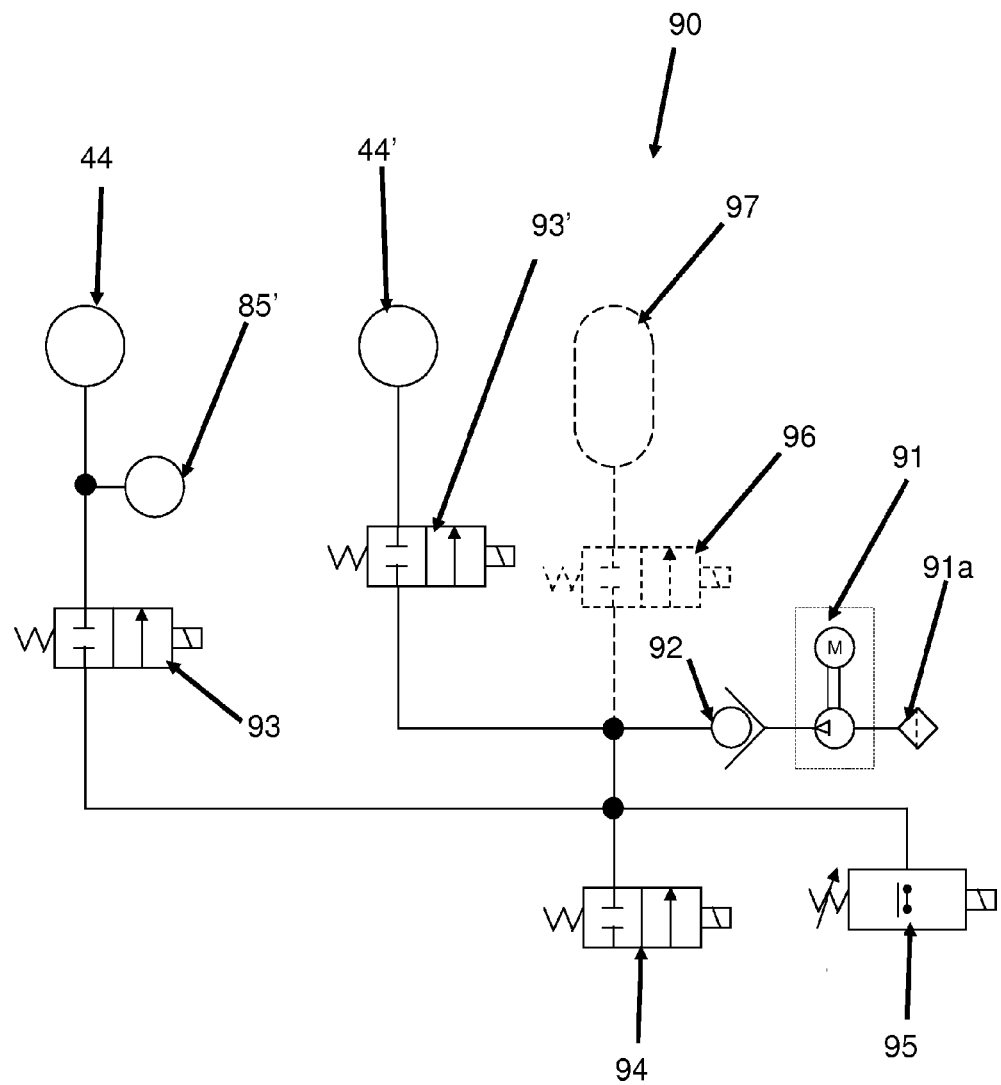
FIG. 19 shows a schematic plan of the pneumatic circuit for the embodiment of FIGS. 16 to 18.

Supported between draw bar bracket (65) and connecting bracket (70) is an air spring being second airbag (85') which is pivotally connected to draw bar bracket (65) at a first airbag pivot mount (86') and pivotally connected to connecting bracket (70) at a second airbag pivot mount (87'). As air is bled from airbag (44) trailer frame (15) is lowered (hitching mechanism (11) remains at its original height) and draw bar (12) pivots clockwise about draw bar pivot mount (71). At the same time, second airbag 85' deflates and pivots about the airbag pivot mounts (86',87'). Second airbag 85' when inflated biases the draw bar (12) towards a safer 'towing' position such that the draw bar (12) is horizontal and fixed in relation to trailer frame (15). The size of the air spring (85') and geometry of its mounting points is selected to suit. FIG. 19 is a schematic of the air circuit system of this embodiment.

The air spring or second airbag (85') ensures that adequate load is applied to the drawbar whilst travelling and in emergency braking situations. The load applied to the draw bar is maintained to less than the tow bar capacity of the tow vehicle (say 250-300 kg) whilst lowering. Importantly, the tow vehicle is not overloaded in the event of air system failure, as may occur with a steel spring and mechanical lock. The air spring or airbag (85') for the draw bar is connected into the same air circuit with one suspension airbag (44) and they are therefore held at common pressure forming a fail safe system. If failure occurs, i.e if air circuit pressure is lost in this part of the pneumatic system, one side of the trailer would lower to the ground as airbag (44) deflates, and the draw bar would hinge as second airbag (85') deflates. The trailer frame would contact the road and the driver of the vehicle would be soon made aware of the situation, yet the vehicle's tow bar would not be overloaded.

Advantageously, this avoids the disadvantage of the first embodiment of the pivoting arrangement, as in the first embodiment, in the event of actuation means (air bag) or system failure, the rear of the trailer would contact the ground but the draw bar would not hinge, resulting in approximately half of the gross trailer mass being applied to the tow vehicle.

In the second embodiment, a single air system with a fail-safe mode is therefore used to both raise and lower the trailer, to allow pivoting or hinging of the draw bar and to lock the draw bar in a straight, towing, position. Advantageously, the whole raising and lowering operation may therefore be automatically controlled on a single system. The fail-safe aspect of the system is particularly of note where the actuation means is the first airbag, that is, the system does not have a mirror image airbag on the other side of the trailer. However, the fail-safe system is also relevant where the actuation means includes a mirror image airbag on the other side of the trailer, as shown in FIGS. 16 to 19.

FIG. 19 shows a control system in the form of a pneumatic circuit or air system circuit (90) having the first airbag (44) and second airbag (85') on a single circuit which may be isolated by a first solenoid operated isolating valve (93). Thus pressure in the first and second airbags (44, 85') is equal and depressurisation of the first air bag (44) (e.g. through a leak or failure) will also depressurise second airbag (85') as described above.

The mirror image airbag could be directly connected (not shown) with the first and second airbags such that it also has the same pressure, however preferably the mirror image airbag (44') is isolated behind a second solenoid operated isolating valve (93'), as this increases the stability of the trailer under load and while towing. Loss of pressure in either of the first and second airbags (44, 85') results in the front and one side of the trailer lowering, avoiding load on the towbar and maintaining enough stability for the driver to pull over. Loss of pressure in the mirror image airbag (44') results in a slight drop on that side and slight increase in the vehicle's tow bar load, however again stability is maintained, as pressure is not lost in the first and second airbags (44, 85'), and the trailer can be maintained in a reasonable towing position until the problem is rectified. Thus there is provided a system which is simple, cost-effective and easy to operate, and the whole raising and lowering operation can be automatically controlled on a single system. In the embodiment of FIG. 19, first and second isolating valves (93, 93') are opened to allow pressurised air from a compressor (91) (which has an associated filter (91a) and is behind a check valve (92)) to fill the airbags (44, 44', 85'). When inflated, the first and second isolating valves (93, 93') are closed to retain pressurised air in the air bags (44, 44', 85').

To deflate the airbags (44, 44', 85'), the first and second isolating valves (93, 93') are opened, as is a third solenoid operated isolating valve (94) which vents the pressurised air to atmosphere This valve is also referred to as the venting valve (94). The third isolating valve or venting valve (94) is closed when inflating the airbags (44, 44', 85') so that pressurised air passing from the compressor (91) through the check valve (92) does not vent to atmosphere via third isolating valve (94), but rather passes through open first and second isolating valves (93, 93').

Also located in the circuit (90) is a compressor cut-off pressure switch (95) operable to cut-off the compressor (91) in response to a limit pressure or an unacceptable pressure detected between check valve (92) and first, second and third isolating valves (93, 93', 94).

The check valve (92) ensures that the compressor starts up under no load, and isolates the circuit when the compressor 91 is not running.

Optionally, an air tank (97) may be provided behind a fourth solenoid operated isolating valve (96). The air tank (97) may be filled with pressurised air which is stored until it is necessary to raise the trailer (10) by inflating air bags (44, 44'). Release of the store of pressurised air from the tank (97) provides an initial injection to the circuit (90) and reduces the time required to raise the trailer (10). Preferably, the compressor (91) runs while travelling, with the first, second and third isolating valves (93, 93', 94) closed and the fourth isolating valve (96) open to allow the tank (97) to be filled. The compressor (91) may be powered by the towing vehicle or by other means. Once the tank 97 has been filled at the required pressure, compressor cut-off pressure switch (95) operates to cut-off the compressor and fourth isolating valve (96) is closed.

Preferably, the air tank (97) is incorporated into the trailer chassis or frame (15), for example being formed by chassis hollow section members required for structural rigidity. Making the e.g. square hollow section member(s) air tight will save weight and cost, as well as maximise load space, in comparison to a separate tank or bottle. Multiple hollow sections could be connected to form a distributed 'tank' or reservoir.

Once the trailer bed (16) has been lowered to the ground (7) the load (6) may easily be removed. To raise the trailer back to the towing position, airbags (44, 44', 85') are re-inflated. As airbags (44, 44') are inflated, so is airbag 85' and draw bar (12) returns to a horizontal position.

FIG. 18 shows a draw bar (12) stowed in an upright position, allowing for an unhitched trailer to be positioned in a smaller area. This is useful for storage of the trailer (e.g. in a garage) or for parking the trailer at a race event, whether or not the race car remains loaded. The airbag 85' is disconnected from the connecting bracket (70). Provision of hole (77) provides a convenient method of locking draw bar (12) in an upright position by insertion of a pin (not shown) to hold the draw bar (12) in place.

Figure 14:
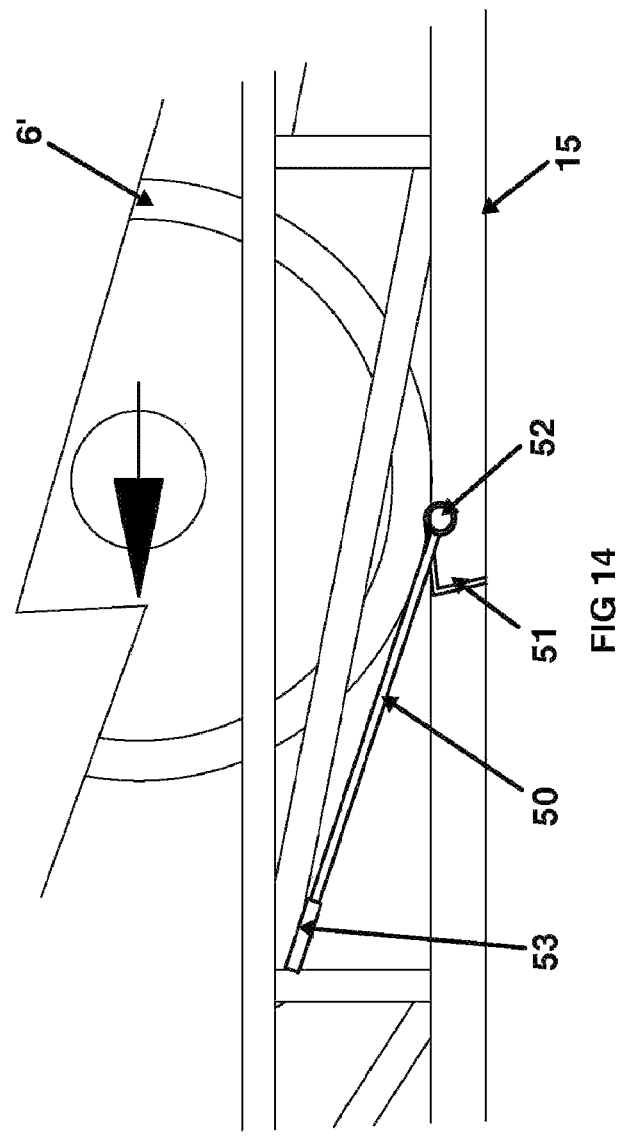
FIG. 14 shows a side view of arrest means for a trailer according to a preferred embodiment of the invention.
Figure 15:
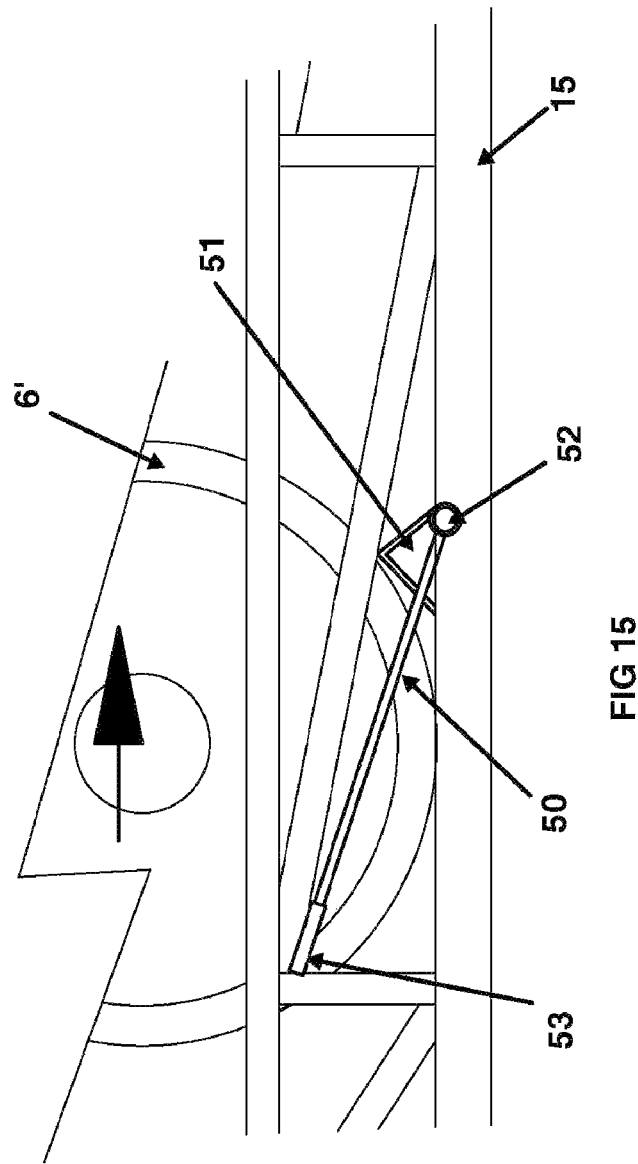
FIG. 15 shows a side view of the arrest means of FIG. 14 in an alternative position.

Preferably, and as shown in FIGS. 14 and 15, a torsion spring (52) having a manual release (53) provides arrest means (50) to prevent the wheel (6') of a race car from rolling backwards off the trailer. This helps to prevent the race car from rolling off the trailer when the trailer frame (15) is in the intermediate position between raised/towing position and lowered/unloading position. FIG. 14 shows the wheel (6') of the race car rolling forward in the direction of the arrow onto the trailer, rolling over the arrest means (50) and depressing a chock (51) connected to or part of torsion spring (52). In FIG. 15, the wheel (6') has passed beyond chock (51), which springs back into position as a chock (51) behind wheel (6'). Wheel (6') is thereby prevented from moving backward in the direction of the arrow. Manual release (53) is braced on trailer frame (15) and may be manually activated (ie rotated) to rotate torsion spring (52) and release the chock (51) in order to unload the race car.

The invention claimed is:

1. A trailer comprising:
   i) a draw bar;
   ii) a trailer frame supporting a trailer bed;
   iii) an arm including a first pivot mount;
   iv) an axle pivotally connected to the arm at the first pivot mount;
   v) an actuator actuatable to exert a force on the arm relative to the trailer frame;
   wherein the axle includes at least one associated wheel and the wheel has a plane of rotation in which the wheel rotates when traveling in a forward direction, and the actuator is located substantially in the plane of rotation;
   whereby the trailer bed may be raised or lowered by exerting a force on the arm relative to the trailer frame;
   wherein the trailer frame includes a second pivot mount, the arm being pivotally movable relative to the trailer frame about the second pivot mount; and
   wherein the trailer frame includes a third pivot mount located higher than and rearward of the second pivot mount, the actuator pivotally mounted to the third pivot mount and actuatable to exert a force on the arm resulting in rotation of the arm about the second pivot mount.

2. A trailer according to claim 1, wherein the first pivot mount is located inwardly of the wheel.

3. A trailer according to claim 1, wherein the actuator exerts the force on the arm at a location substantially in the plane of rotation.

4. A trailer according to claim 1, wherein the actuator exerts the force on the arm at a location forward of the wheel.

5. A trailer according to claim 1, wherein the actuator exerts the force on the arm at a location rearward of the wheel.

6. A trailer according to claim 1, wherein the arm is pivotally connected to the axle at a location inwardly of the wheel and the actuator acts on a portion of the arm at a location substantially in the plane of rotation.

7. A trailer according to claim 1, wherein the second pivot mount is located substantially in the plane of rotation.

8. A trailer according to claim 1, wherein the actuator exerts the force on the arm at a location forward of the second pivot mount.

9. A trailer according to claim 1, wherein the actuator exerts the force on the arm at a location rearward of the second pivot mount.

10. A trailer according to claim 1, wherein the arm includes at least two portions that are angled relative to each other when projected on the plane of rotation.

11. A trailer according to claim 1, wherein the arm includes at least two portions that are angled relative to each other when projected onto a substantially horizontal plane perpendicular to the plane of rotation.

12. A trailer according to claim 1, wherein the arm includes at least a first section and a second section, the first and second sections being in slideable engagement.

13. A trailer according to claim 1, wherein the trailer frame includes a fixed point located higher than and forward of the second pivot mount, the actuator actuatable to exert a force between the fixed point and the arm, resulting in rotation of the arm about the second pivot mount.

14. A trailer according to claim 13, wherein the fixed point is provided by a bracket.

15. A trailer according to claim 1, wherein the actuator includes a first airbag.

16. A trailer according to claim 1, further comprising a draw bar pivot mount, the draw bar pivotally connected to trailer frame via draw bar pivot mount.

17. A trailer according to claim 1, wherein the actuator includes a first airbag, the trailer further including a draw bar pivot mount, the draw bar pivotally connected to trailer frame via draw bar pivot mount and further including a spring and an air valve, the valve being operable to deflate first airbag and the spring biasing the draw bar towards a towing position.

18. A trailer according to claim 1, wherein the actuator includes a first airbag, the trailer further including a draw bar pivot mount, the draw bar pivotally connected to trailer frame via draw bar pivot mount and further including a draw bar bracket mounted on the draw bar, a connecting bracket mounted on the trailer frame, and a second airbag extending between the draw bar bracket and the connecting bracket, the second airbag when inflated positioning the draw bar in a towing position.

19. A trailer according to claim 18, wherein the first and second airbags include a common first isolating valve and a common venting valve, whereby they are held at a common pressure.

20. A trailer according to claim 1, further comprising brakes associated with the wheel and a safety brake interlock switch operable to prevent the wheel from turning when the draw bar is not in a towing position.

21. A trailer according to claim 1, wherein the draw bar is configured to couple the trailer to a tow vehicle and the trailer bed is configured to be lowered flat to the ground for loading and unloading without decoupling the trailer from the tow vehicle.

22. A trailer comprising:
a draw bar;
a trailer frame;
a wheel carrying structure pivotally connected to the trailer frame and carrying at least one wheel; and
an actuator actuatable to exert an at least approximately vertical force on the wheel carrying structure, at a location fore or aft of the pivotal connection between the wheel carrying structure and the trailer frame, to move the trailer frame between a lowered position, in which the trailer frame is in proximity to the ground to be loaded therefrom, and a raised position for towing;
wherein the wheel has a plane of rotation in which the wheel rotates when traveling in a forward direction, and the actuator is located substantially in the plane of rotation.

23. A trailer according to claim 22 wherein the actuator exerts the force on the wheel carrying structure at a location forward of the wheel.

24. A trailer according to claim 22 wherein the actuator exerts the force on the wheel carrying structure at a location rearward of the wheel.

25. A trailer according to claim 22 wherein the actuator exerts the force on the wheel carrying structure at a location forward of the pivotal connection pivotally connecting the wheel carrying structure and the trailer frame.

26. A trailer according to claim 22 wherein the actuator exerts the force on the wheel carrying structure at a location rearward of the pivotal connection pivotally connecting the wheel carrying structure and the trailer frame.

27. A trailer according to claim 23 wherein the actuator exerts the force on the wheel carrying structure at a location rearward of the pivotal connection pivotally connecting the wheel carrying structure and the trailer frame.

28. A trailer according to claim 27 further comprising a pivotal connection pivotally connecting the trailer frame and the actuator.

29. A trailer according to claim 22 further comprising a pivotal connection pivotally connecting the trailer frame and the actuator.

30. A trailer according to claim 22 wherein the draw bar is pivotally connected to the trailer frame so as to pivot upwardly relative to the trailer frame from a towing position so that the trailer frame is able to be lowered flat to the ground for loading and unloading without decoupling the trailer from a tow vehicle.

31. A trailer according to claim 30 further comprising a releasable mechanism for rigidly locking the draw bar in its towing position.

32. A trailer according to claim 30 further comprising a further actuator actuatable to drive the draw bar towards the towing position.

33. A trailer according to claim 32 wherein the further actuator is an airbag.

34. A trailer according to claim 22 wherein the actuator is an airbag.

35. A trailer according to claim 28 wherein the actuator is an airbag.

36. A trailer according to claim 34 further comprising an accumulator in communication with each airbag.

37. A trailer according to claim 35 further comprising a further airbag, acting on a further wheel carrying structure, and a valve for selectively isolating the further airbag from the actuator.

38. A trailer comprising:
a draw bar;
a trailer frame;
a wheel carrying structure carrying at least one wheel; and
an airbag pivotally mounted to the trailer frame actuatable to exert a force on the wheel carrying structure to raise or lower the trailer frame.

39. A trailer according to claim 38 further comprising an accumulator in communication with the actuator.

40. A trailer according to claim 38 further comprising a pivotal connection pivotally connecting the wheel carrying structure and the trailer frame.

41. A trailer comprising:
a draw bar;
a trailer frame; and
at each side of the trailer
a wheel carrying structure carrying at least one wheel; and
a pneumatic actuator to exert a force on the wheel carrying structure to raise or lower the trailer frame;
wherein each pneumatic actuator is isolated for stability of the trailer while towing.

42. A trailer according to claim 41 further comprising a valve for selectively isolating each pneumatic actuator.

43. A trailer according to claim 41 wherein each pneumatic actuator is an airbag.

44. A trailer according to claim 43 further comprising a respective pivotal connection pivotally connecting the trailer frame and each pneumatic actuator.

45. A trailer according to claim 41 wherein the draw bar is pivotally connected to the trailer frame so as to pivot upwardly relative to the trailer frame from a towing position so that the trailer frame is able to be lowered flat to the ground for loading and unloading without decoupling the trailer from a tow vehicle.

46. A trailer according to claim 45 further comprising a releasable mechanism for rigidly locking the draw bar in its towing position.

47. A trailer according to claim 41 further comprising an accumulator for supplying each pneumatic actuator.

* * * * *